United States Patent
Harder

(10) Patent No.: US 12,460,569 B2
(45) Date of Patent: Nov. 4, 2025

(54) ENGINE DATA PROCESSOR AND COMPUTER-IMPLEMENTED METHOD FOR THE ADJUSTMENT OF AN EXHAUST GAS COMPOSITION

(71) Applicant: Rolls-Royce Solutions GmbH, Friedrichshafen (DE)

(72) Inventor: Karsten Harder, Oberteuringen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/884,387

(22) Filed: Sep. 13, 2024

(65) Prior Publication Data

US 2025/0092812 A1   Mar. 20, 2025

(30) Foreign Application Priority Data

Sep. 15, 2023 (DE) .......................... 102023003755.9

(51) Int. Cl.
| | |
|---|---|
| *B60T 7/12* | (2006.01) |
| *F01N 9/00* | (2006.01) |
| *F01N 11/00* | (2006.01) |

(52) U.S. Cl.
CPC .............. *F01N 11/00* (2013.01); *F01N 9/007* (2013.01); *F01N 2900/1614* (2013.01)

(58) Field of Classification Search
CPC .............. F01N 9/002; F01N 2900/1606; F02D 41/029; F02D 2200/0812
USPC ........................................................ 701/108
See application file for complete search history.

(56) References Cited

U.S. PATENT DOCUMENTS

| | | |
|---|---|---|
| 11,255,283 B1 | 2/2022 | Kim et al. |
| 2008/0155968 A1 | 7/2008 | Salemme et al. |
| 2012/0279206 A1* | 11/2012 | Geyer ................... F01N 3/2053 60/287 |
| 2013/0152550 A1* | 6/2013 | Karlsson ............. F02D 41/1448 60/311 |
| 2020/0095912 A1* | 3/2020 | Bouws .................... F01N 3/106 |

(Continued)

FOREIGN PATENT DOCUMENTS

| | | |
|---|---|---|
| DE | 10 2014 002 037 A1 | 8/2015 |
| KR | 10-2014-0043428 A | 4/2014 |

*Primary Examiner* — Logan M Kraft
*Assistant Examiner* — James J Kim
(74) *Attorney, Agent, or Firm* — TAYLOR & EDELSTEIN, PC

(57) ABSTRACT

An engine data processor for an internal combustion engine is structured and arranged for: receiving a geometric characteristic of an exhaust unit through which the exhaust gas composition can be discharged, and determining from the geometric characteristic a smoke visibility limit value; receiving filter fill status information from an exhaust gas filter for filtering the exhaust gas composition; receiving a mean catalytic converter temperature of an exhaust gas catalytic converter for catalyzing the exhaust gas composition and determining a nitrogen dioxide conversion rate subject to the filter fill status information which has been received and the mean catalytic converter temperature; comparing the calculated nitrogen dioxide conversion rate with the smoke visibility limit value, and determining therefrom a control variable for the internal combustion engine so that the exhaust gas composition is invisible; and issuing the control variable.

12 Claims, 4 Drawing Sheets

(56) References Cited

U.S. PATENT DOCUMENTS

2023/0249131 A1\* 8/2023 Kim .................. B01D 53/9418
423/213.2

\* cited by examiner

ENGINE DATA PROCESSOR AND COMPUTER-IMPLEMENTED METHOD FOR THE ADJUSTMENT OF AN EXHAUST GAS COMPOSITION

CROSS REFERENCE TO RELATED APPLICATIONS

This claims priority to German patent application no. 10 2023 003 755.9, filed Sep. 15, 2023, which is incorporated herein by reference.

BACKGROUND OF THE INVENTION

1. Field of the Invention

The present invention relates to an internal combustion engine, and, more particularly, to an engine data processor.

2. Description of the Related Art

Internal combustion engines are often equipped with control systems. They serve to receive and evaluate sensor data, process the latter by way of algorithms and to establish and issue control variables from the results. The purpose of the control variables that are issued by a control system is usually to operate various actuators of the internal combustion engine within safe limit ranges. For example, the limit ranges can define a permissible temperature range or a permissible pressure range.

Internal combustion engines are used in vehicles as drive systems or in buildings in combination with a generator as a power unit. In an internal combustion engine, a fuel is burned, thus providing mechanical power. This power can be used to drive a vehicle or a generator.

Internal combustion engines are to be operated so that legal emission requirements are met. A legal emission specification often includes a limit value for a maximum amount of nitrogen oxide which may be emitted as an exhaust gas from the internal combustion engine. Such a limit value is usually optionally stored in the control system of the internal combustion engine. During operation of the internal combustion engine, several sensors monitor the state of the internal combustion engine. The control system of the internal combustion engine evaluates the state variables and, therefrom, calculates a number of control variables with which actuators that are part of the internal combustion engine can be operated. The internal combustion engine can thus provide the mechanical performance for which it was designed. It can also be in a safe state at all times and comply with legal emission requirements.

An internal combustion engine of the type mentioned at the beginning is designed to monitor the amount of nitrogen oxide emitted and to comply with the emission specifications with regard to the maximum permissible amount of nitrogen oxide.

A disadvantage for operators of the known internal combustion engines is that the internal combustion engine can emit visible smoke, even if it complies with all legal emission requirements. Visible smoke emitted by the internal combustion engine increases the probability of contaminating and staining the surface of objects or components located near the internal combustion engine. Therefore, internal combustion engines which emit visible smoke are considered undesirable by an increasing number of operators.

Document DE 10 2014 002 037 A1 discloses a method for regulating the $NO_2$ leakage in an internal combustion engine with a diesel oxidizing catalytic converter (DOC) and diesel particulate filter. The procedure includes the determination of a current $NO_2$ concentration at the exit point from an exhaust gas aftertreatment system using a $NO_2$ formation model and the comparison of the determined $NO_2$ concentration with a parameterizable $NO_2$ limit concentration in the form of the visibility limit of $NO_2$.

A method for operating a gas engine system is known from U.S. Pat. No. 11,255,283 B1. The method includes increasing the temperature of an oxidizing catalytic converter in an exhaust system and bypassing the oxidizing catalytic converter with at least part of the exhaust gas produced during the combustion of gas.

What is needed in the art is a cost-effective, safe and clean internal combustion engine operation in which no visible smoke is generated. In particular, an improved internal combustion engine is to be provided which complies with all legal emission requirements and does not emit visible yellow smoke induced by nitrogen dioxide.

SUMMARY OF THE INVENTION

The current invention relates to an engine data processor. It moreover relates to a computer-implemented method for the adjustment of an exhaust gas composition. The present invention provides an engine data processor for the adjustment of a leaking exhaust gas composition for an internal combustion engine, wherein engine data processor is designed to: receive a geometric characteristic of an exhaust unit through which the exhaust gas composition can be discharged and to determine therefrom a smoke visibility limit value; receive filter fill status information from an exhaust gas filter designed to filter the exhaust gas composition; receive a mean catalytic converter temperature of an exhaust gas catalytic converter designed to catalyze the exhaust gas composition and to determine a nitrogen dioxide conversion rate subject to the received filter fill status information and the mean catalytic converter temperature; compare the calculated nitrogen dioxide conversion rate with the smoke visibility limit value and to determine therefrom a control variable for the internal combustion engine so that the exhaust gas composition is invisible; and issue the control variable.

An inventive engine data processor for an internal combustion engine serves to adjust a leaking exhaust gas composition. The exhaust gas composition exhibits an amount of nitrogen oxide. For example, the exhaust gas composition leaks from an internal combustion engine or an exhaust gas aftertreatment system that is connected to an engine. In particular, the engine data processor is used to adjust the amount of nitrogen dioxide in the exhaust gas composition.

The engine data processor is designed to receive a geometric characteristic of an exhaust unit through which the exhaust gas composition can be discharged and to therefrom determine a smoke visibility limit value. The exhaust unit can be assigned to the internal combustion engine or can be part of an exhaust gas aftertreatment system that is separate from the internal combustion engine.

The smoke visibility limit value is a nitrogen dioxide limit value at which no visible smoke escapes from the exhaust unit, wherein however, visible smoke is to be expected if said limit is exceeded. The amount can be determined, for example, by using a look-up table in which values of a variable—such as a nitrogen oxide emission value—are compiled with corresponding values of the geometric characteristic.

For example, the smoke visibility limit value is a nitrogen dioxide limit value that should not exceed the exhaust gas composition in order to remain invisible. Alternatively, the smoke visibility limit value is a nitrogen dioxide limit value, which may also include the exhaust gas composition in order to remain invisible. However, exceeding it leads to the exhaust gas composition becoming visible.

The exhaust unit is designed for example, as a cylindrical smokestack. A cylindrical smokestack provides a flow geometry for the exhaust gas composition that is gentle on the machine.

The geometric characteristics of the exhaust unit can for example be a diameter of the exhaust unit, a cross-sectional area of the exhaust unit or a radius of the exhaust unit. In particular, the diameter of the exhaust unit has proven to be a geometric variable that has significant influence on the visibility of the exhaust gas composition, but which generally exhibits a different amount in each installation in which an internal combustion engine is used.

Moreover, the engine data processor is designed to receive filter fill status information from an exhaust gas filter designed to filter the exhaust gas composition. The filter fill status information indicates the fill status of the exhaust filter, which may for example be empty, slightly filled or full.

The engine data processor is advantageously designed to receive filter fill status information from an exhaust gas filter designed to filter the exhaust gas composition and—depending on the filter fill status information—to determine a series of nitrogen conversion rates. A nitrogen dioxide conversion rate indicates the value of an amount of nitrogen dioxide in the exhaust gas composition. The series of nitrogen dioxide conversion rates indicates the values that the nitrogen dioxide amount can assume in the exhaust gas composition if the exhaust gas composition is filtered at a filter fill status according to the received filter fill status information.

The engine data processor is also designed to receive a mean catalytic converter temperature of an exhaust gas catalytic converter designed to catalyze the exhaust gas composition and to determine a nitrogen dioxide conversion rate subject to the received filter fill status information and the mean catalytic converter temperature.

Advantageously, the engine data processor is designed to determine a nitrogen dioxide conversion rate, subject to the received mean catalytic converter temperature from the determined series of nitrogen dioxide conversion rates.

The nitrogen dioxide conversion rate that was determined subject to the mean catalytic converter temperature and the filter fill status information indicates the value of the nitrogen dioxide amount present in the exhaust gas composition that it assumes after catalysis in the exhaust gas catalytic converter at mean catalytic converter temperature and after filtering in the exhaust gas filter when the detected filter fill status is present. Taking into account the mean catalytic converter temperature and the filter fill status facilitates precise determination of the nitrogen dioxide conversion rate.

The engine data processor is designed to compare the calculated nitrogen dioxide conversion rate and the smoke visibility limit value with each other and to therefrom establish a control variable for the internal combustion engine so that the exhaust gas composition is invisible and to issue the control variable.

By including the geometric characteristics of the exhaust unit in the determination of the control variable for the operation of the internal combustion engine, an important, customer-specific operating attribute is considered in order to adjust a permanently invisible exhaust gas composition. By taking into account the geometric characteristics, each engine data processor can be adjusted subject to the installation conditions of the corresponding internal combustion engine in such a way that—regardless of the installation space of the internal combustion engine—a clean and cost-effective operation of the internal combustion engine with a dirt-free and invisible exhaust gas composition can be made possible.

The inventive solution can be improved by various arrangements, each of which is advantageous in its own right and can be combined with one another as desired. These design arrangements and the advantages associated with them are discussed below. The advantages described with respect to the engine data processor and the internal combustion engine also apply to the computer-implemented method according to the invention and vice versa.

In a first arrangement, the engine data processor is designed to receive a nitrogen oxide emission value detected at the exhaust unit and an exhaust unit pressure value and to determine the smoke visibility limit value therefrom. The consideration of the aforementioned condition variables at the exhaust unit enables a more precise determination of the smoke visibility limit value.

The engine data processor is optionally designed to receive a filter pressure value of the exhaust gas filter and the exhaust unit pressure value and to determine the filter fill status information from the exhaust unit pressure value and the filter pressure value. Utilization of the filter pressure value and the exhaust unit pressure value enables precise determination of the filter fill status information in real time, which facilitates a more accurate determination of the nitrogen dioxide conversion rate.

In an additional arrangement, the engine data processor is designed to receive a filter temperature and a catalytic converter temperature and to therefrom measure the mean catalytic converter temperature. This allows for the determination of a more accurate mean catalytic converter temperature and, consequently, a more accurate determination of the nitrogen dioxide conversion rate.

The engine data processor is optionally designed to suppress yellow smoke and is moreover designed to determine at least one smoke visibility limit in the form of a yellow smoke visibility limit and to determine the control variable for an internal combustion engine so that the generation of yellow smoke is suppressed. Yellow smoke is a type of visible smoke that occurs often in the operation of internal combustion engines.

The engine data processor optionally includes a conversion unit that is designed to calculate a series of increased or decreased nitrogen conversion rates depending on the filter fill status information. The engine data processor advantageously includes a conversion unit designed to calculate lower nitrogen conversion rates at increasing exhaust gas filter fill status. This facilitates ongoing adjustment of the calculated nitrogen conversion rates to the currently determined filter fill status and contributes to a more accurate determination of the nitrogen dioxide conversion rate.

In one advantageous arrangement, the engine data processor includes a model-predictive controller, wherein the model-predictive controller includes a limiting unit which is designed to receive the nitrogen dioxide conversion rate and the smoke visibility limit value and to therefrom develop an operating limit for the adjustment of an invisible exhaust gas composition for the internal combustion engine. This facilitates cost-effective operation of the internal combustion engine and at the same time avoids visible smoke.

The objective defined at the beginning can also be met by an internal combustion engine, wherein the internal combustion engine includes an engine data processor according to one of the aforementioned designs, an engine to provide mechanical power and an exhaust gas aftertreatment system including the exhaust gas catalytic converter and the exhaust gas filter.

Based on the described features of the engine data processor, the inventive internal combustion engine can be operated without visible smoke at optimum operating costs. In particular, adjustment of the exhaust gas composition can advantageously occur entirely in the engine data processor and thus internally in the internal combustion engine, taking into account engine installation space and geometric characteristics of the exhaust unit.

In one advantageous arrangement, the model-predictive controller is designed to generate from the operating limit operationally optimal controller specifications for adjustment of the mean catalytic converter temperature. This facilitates the establishment of commands with which the detected mean catalytic converter temperature can be actively influenced in order to enable cost-optimized operation of the internal combustion engine in addition to the invisible exhaust gas composition.

The internal combustion engine optionally includes an actuator controller, which is designed to receive the optimum operating control specifications and to therefrom determine the control variable for an actuation group of the engine. The control variable can for example be commands to operate an actuation group designed as valves in the engine for a specific duration and in a specific sequence so that a specific engine exhaust gas temperature can be set to influence the mean catalytic converter temperature in a cost-optimized manner. This allows the engine exhaust gas temperature to influence the mean catalytic converter temperature to facilitate cost-effective operation of the internal combustion engine.

The present invention also provides a computer-implemented method. A computer-implemented method for adjustment of a filtered and catalyzed exhaust gas composition at an exhaust unit of an internal combustion engine includes the following steps:
receiving a geometric characteristic of the exhaust unit,
establishing a smoke visibility limit value from the geometric characteristic,
receiving a mean catalytic converter temperature and a filter fill status information, and establishing a nitrogen dioxide conversion rate, depending on the catalytic converter temperature and the filter fill status information,
comparison of the established smoke visibility limit value with the nitrogen dioxide conversion rate, and
establishing a control variable with which the internal combustion engine is to be operated so that the exhaust gas composition that is to be discharged at the exhaust unit is invisible.

The method is advantageous because it facilitates cost-effective operation of the internal combustion engine without visible smoke. The consideration of the geometric characteristic of the exhaust unit facilitates precise determination of the control variables and flexible adaptation of the method to exhaust units having various geometric characteristics. Taking into account the mean catalytic converter temperature and the filter fill status information increases the accuracy of the exhaust gas composition adjustment.

The invention is described in further detail below with exemplary reference to the drawings. The combination of features shown by way of example in the embodiments shown can be supplemented by further features required for a specific application according to the above explanations, depending on the properties of the inventive engine data processor and/or the inventive internal combustion engine. Also, in accordance with the above explanations, individual features can be omitted from the embodiments described if the effect of this feature in a specific application does not matter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Below, an engine data processor 1 according to the invention is described with reference to FIG. 1. Moreover, an internal combustion engine 30 according to the invention is described on the basis of FIG. 2 and a method 100 according to the invention is described on the basis of FIG. 4.

Figure 1:
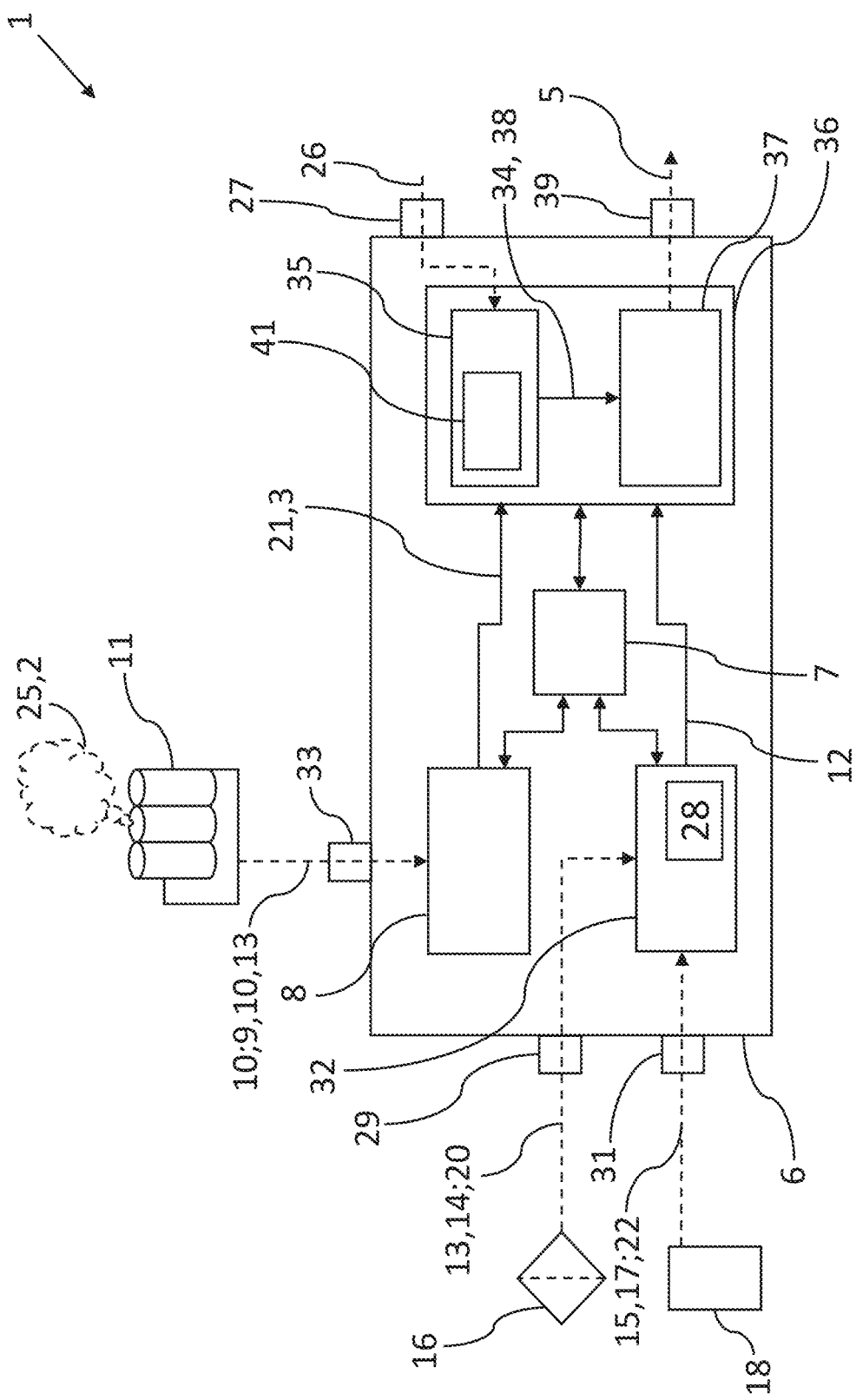
FIG. 1 is a schematic representation of an engine data processor according to one exemplary embodiment.

FIG. 1 is a simplified, schematic representation of engine data processor 1. Engine data processor 1 may have an independent processor board 6 and/or be integrated on a circuit board of internal combustion engine 30 (not shown). The units, blocks, and modules of engine data processor 1 described below can be implemented in hardware, software, or in a combination of both.

Engine data processor 1 is intended for adjustment of a leaking exhaust gas composition 25 for an internal combustion engine. Exhaust gas composition 25 includes an amount of nitrogen oxide and leaks from an engine 19 or from an exhaust unit 11 of an exhaust gas aftertreatment system 42.

Engine data processor 1 may, for example, include an exhaust data interface 33, where it receives a geometric characteristic 10 of exhaust unit 11 by way of which adjustable exhaust gas composition 25 can be discharged. Exhaust unit 11 is for example an arrangement of a number of cylindrical smokestacks 23, and geometric characteristic 10 is for example a diameter 24 of a smokestack 23. Alternatively, geometric characteristic 10 may be a cross-sectional surface of all smokestacks 23 (not shown).

Engine data processor 1 is designed to establish a smoke visibility limit value 21, subject to geometric characteristic 10. Smoke visibility limit value 21 is a certain amount of a physical variable at which no visible smoke 2 emerges at the exhaust unit 11 but above which visible smoke 2 is to be expected. The amount can be determined, for example, with a unit 8 for the determination of a smoke visibility limit value, which has a lookup table (not shown), in which values of a variable, such as a nitrogen oxide emission value, are compiled with corresponding values of geometric characteristic 10. Smoke visibility limit value 21 is optionally a nitrogen dioxide limit value.

For example, smoke visibility limit value 21 is an exclusionary nitrogen dioxide limit value, which must not be reached by exhaust gas composition 25 in order to remain invisible. Alternatively, the smoke visibility limit value 21 is a nitrogen dioxide limit value which the exhaust gas composition 25 may inclusively amount to, in order to remain invisible; however, exceeding it leads to exhaust gas composition 25 becoming visible.

Figure 2:
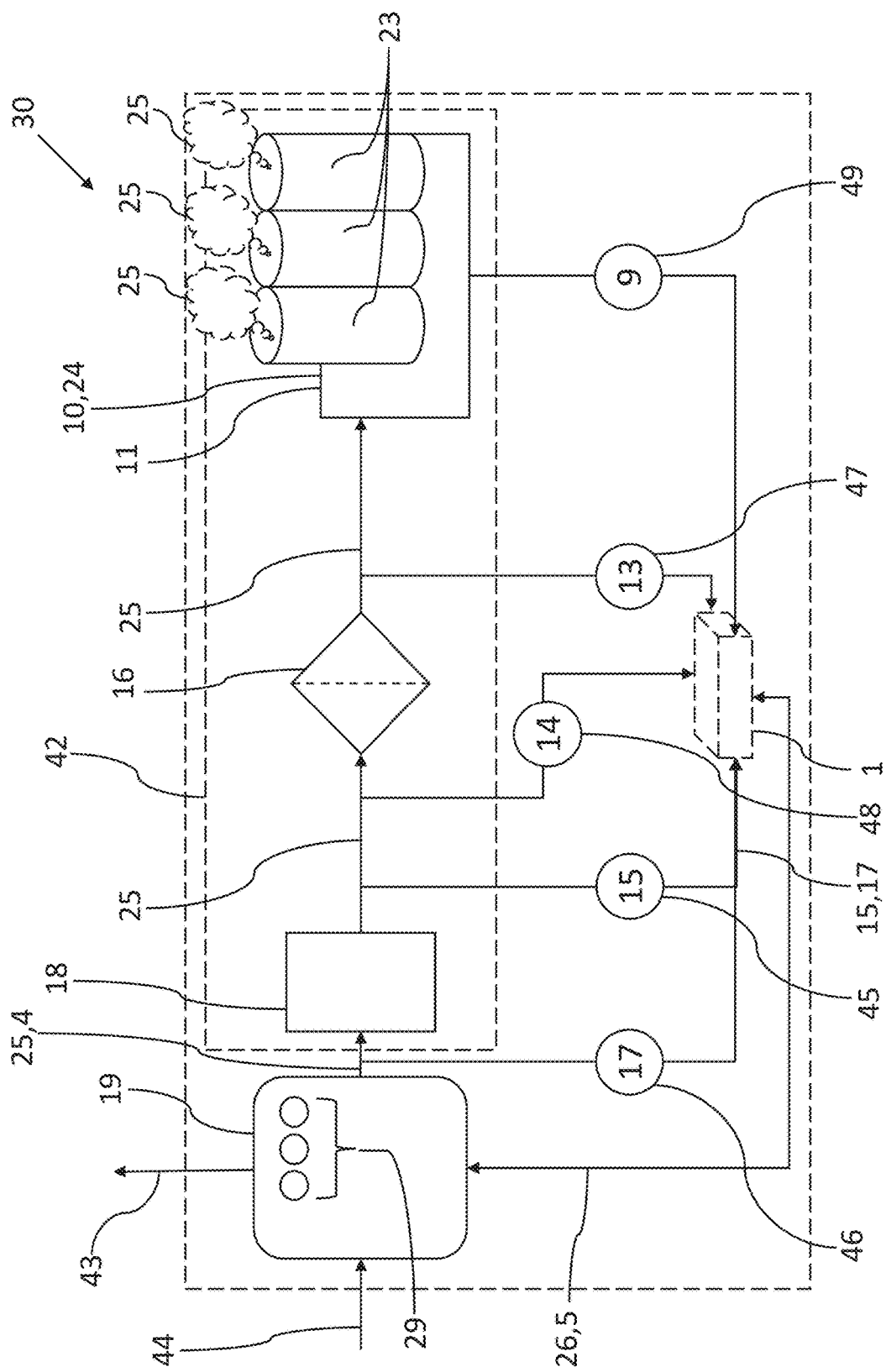
FIG. 2 is a schematic representation of an internal combustion engine according to one exemplary embodiment.

Moreover, engine data processor 1 may have a filter status data input 51 at which a filter fill status information 20 of an exhaust gas filter 16 that is designed to filter exhaust gas composition 25 can be received (see FIG. 2). Received filter fill status information 20 contains a statement as to how empty or full exhaust gas filter 16 currently is and has an effect upon the amount of nitrogen dioxide that is present in exhaust gas composition 25 after it has been filtered.

In addition, engine data processor 1 may include a temperature data input 31 at which a mean catalytic converter temperature 22 of an exhaust catalytic converter 18 that is designed to catalyze exhaust gas composition 25 can be received (see FIG. 2). The mean catalytic converter temperature 22 has an effect upon the amount of nitrogen dioxide that is present in exhaust gas composition 25 after it has been catalyzed.

Engine data processor 1 is advantageously designed to calculate a series 28 of nitrogen dioxide conversion rates 12 subject to the received filter fill status information 20. Nitrogen dioxide conversion rate 12 indicates the value of an amount of nitrogen oxide in exhaust gas composition 25 that is converted into nitrogen dioxide during exhaust gas aftertreatment, for example in exhaust gas aftertreatment system 42. It has been recognized that the nitrogen dioxide conversion rate plays an important role in the formation of visible smoke 2, in particular of yellow smoke.

Series 28 of nitrogen dioxide conversion rates 12 indicates the values that the amount of nitrogen dioxide in exhaust gas composition 25 can assume when it is filtered in exhaust gas filter 16 at a filter fill status according to filter fill status information 20.

Engine data processor 1 is further designed to establish a nitrogen dioxide conversion rate 12, subject to received filter fill status information 20 and mean catalytic converter temperature 22.

Nitrogen dioxide conversion rate 12, that was determined subject to mean catalytic converter temperature 22 and filter fill status information 20, indicates the value of the amount of nitrogen dioxide present in exhaust gas composition 25 after catalysis in exhaust gas catalytic converter 18 at mean catalytic converter temperature 22 and after filtering in exhaust gas filter 16 at the filter fill status recorded in filter fill status information 20. Considering mean catalytic converter temperature 22 and filter fill status information 20 facilitates a precise determination of nitrogen dioxide conversion rate 12.

Figure 3:
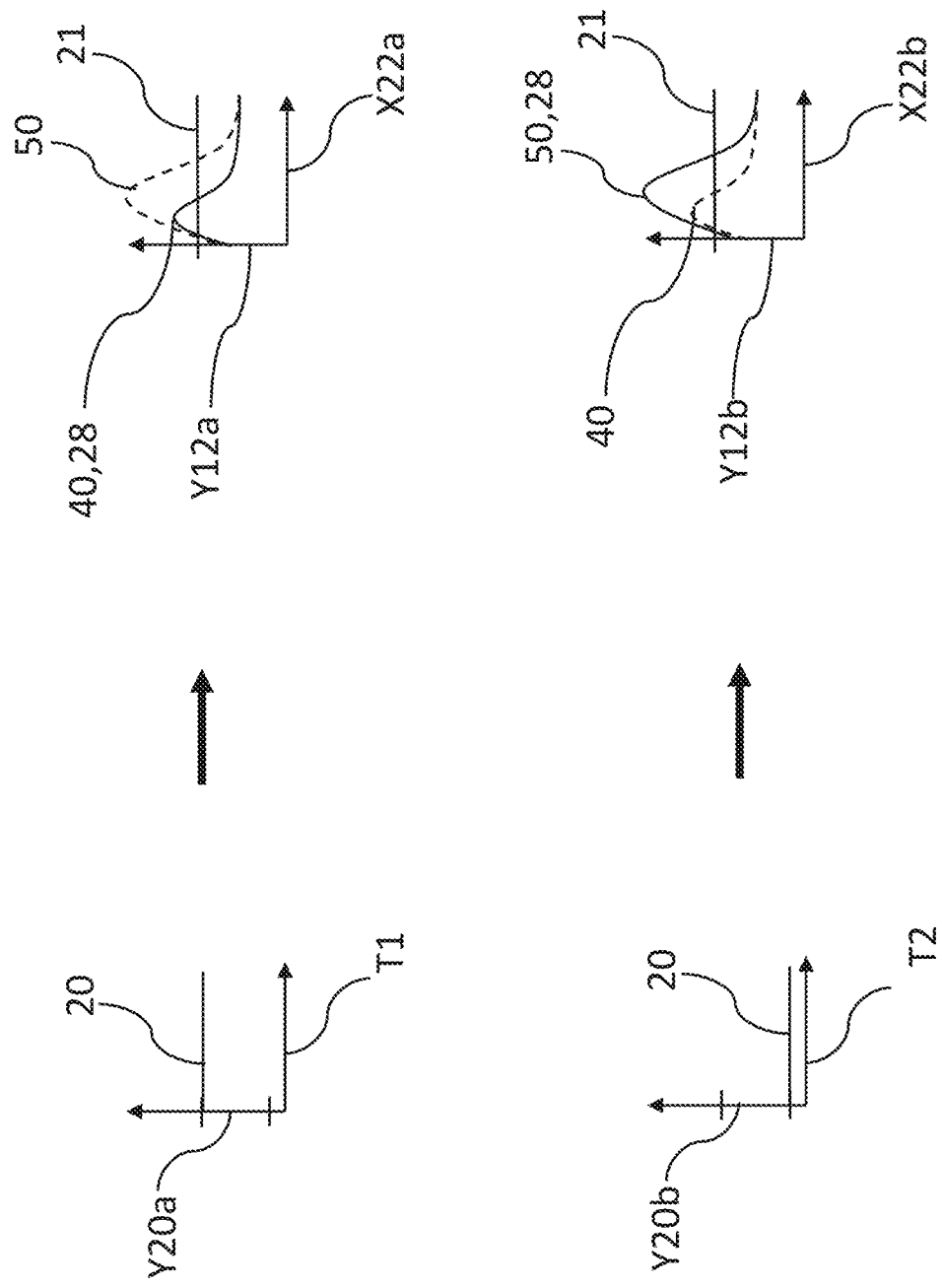
FIG. 3 is a representation of two different filter fill statuses and the determination dependent thereon of a series of nitrogen dioxide conversion rates.

FIG. 3 illustrates the relationship between two different sets of filter fill status information 20 in different time periods T1 and T2 (top left, bottom left) and the determination of series 28 of nitrogen dioxide conversion rates 12 based on this.

An axis Y20a shows the level of a filter fill status information 20 in a first time period T1 in the upper left. The level of filter fill status information 20 along the Y20a axis is high, indicating a full exhaust gas filter 16. On FIG. 3, top right, a first curve 40 and a second curve 50 have been plotted, which represent possible series of nitrogen dioxide conversion rates 12 (axis Y12a) subject to mean catalytic converter temperature 22 (axis X22a). Since the exhaust filter 16 is full (see above left, axis Y20a), first curve 40 is determined as series 28 of nitrogen dioxide conversion rates 12, and the second curve 50 is not considered further.

In the lower left, on the other hand, the level of the filter fill status information 20 is low in a time period T2 (axis Y20b), which indicates an empty or barely filled exhaust filter 16. This has the effect that at the bottom right of potential curves 40 and 50, second curve 50 with the higher nitrogen dioxide conversion rates 12 is determined as series 28 of nitrogen dioxide conversion rates 12 and that in this case first curve 40 is not considered further.

As can be seen on the right side of FIG. 3, nitrogen dioxide conversion rate 12 which is consistent with the conditions under which exhaust gas composition 25 has been post-treated can be determined from the selected series 28 of nitrogen dioxide conversion rates 12 subject to the mean catalytic converter 22 temperature received from engine data processor 1.

Engine data processor 1 is advantageously designed to determine a nitrogen dioxide conversion rate 12 depending on received mean catalytic converter temperature 22 from series 28 of nitrogen dioxide conversion rates.

Engine data processor 1 is designed to compare calculated nitrogen dioxide conversion rate 12 and smoke visibility limit value 21 with each other and to determine therefrom a control variable 5 for the internal combustion engine in a way that exhaust gas composition 25 is invisible, and to issue control variable 5. To issue control variable 5, the engine data processor may include an output data interface 39.

By including geometric characteristic 10 of exhaust unit 11 in the determination of control variable 5 for internal combustion engine operation, an important, customer-specific operating attribute is considered in order to adjust a permanently invisible exhaust gas composition 25. By considering geometric characteristic 10, each engine data processor 1 can be adjusted, depending on the installation conditions of the corresponding internal combustion engine in such a way that clean and cost-effective internal combustion engine operation with a dirt-free and invisible exhaust gas composition 25 can be made possible, regardless of an internal combustion engine installation space.

Moreover, by considering the catalytic converter temperature 22 and filter fill status information 20, an accurate nitrogen dioxide conversion rate 12 is determined, which at any time, for example also in real time, reproduces the conditions under which exhaust gas composition 25 receives aftertreatment, thereby increasing the adjustment accuracy of exhaust gas composition 25.

Internal combustion engine 30 according to FIG. 2 includes engine data processor 1, an engine 19 to provide mechanical power 43 and an exhaust aftertreatment system 42 which includes exhaust gas catalytic converter 18 and exhaust gas filter 16. Exhaust gas aftertreatment system 42 can advantageously include exhaust unit 11. Engine 19 is operated for example with a fuel 44.

Thanks to the described features of engine data processor 1, internal combustion engine 30 according to the invention can be operated at optimized operating costs without visible smoke. In particular, by taking into account the engine installation space (not shown) and geometric characteristic 10 of exhaust unit 11, the adjustment of exhaust gas composition 25 can advantageously occur entirely in engine data processor 1 and thus in internal combustion engine 30.

In an advantageous arrangement, engine data processor 1 is designed to receive a nitrogen oxide emission value 9 recorded at exhaust unit 11, and an exhaust unit pressure value 13, and to therefrom determine smoke visibility limit value 21. Considering the above-mentioned variables at exhaust unit 11 facilitates a more precise determination of smoke visibility limit value 21. Internal combustion engine 30 advantageously includes a first pressure sensor 47 for measuring exhaust unit pressure value 13 and a gas concentration sensor 49 for detection of nitrogen oxide emission value 9.

Engine data processor 1 is advantageously designed to receive a filter pressure value 14 of exhaust gas filter 16 and exhaust unit pressure value 13 and to determine filter status information 20 from exhaust unit pressure value 13 and filter pressure value 14. The use of filter pressure value 14 and exhaust unit pressure value 13 facilitates precise determination of filter status information 20 in real time, which allows for a more accurate determination of nitrogen dioxide conversion rate 12. In one advantageous arrangement, internal combustion engine 30 includes a second pressure sensor 48 to measure filter pressure value 14.

In an additional arrangement, engine data processor 1 is designed to receive a filter temperature 15 and a catalytic converter temperature 17 and to therefrom measure mean catalytic converter temperature 22. This facilitates a more accurate determination of the more accurate mean catalytic converter temperature 22 and, consequently, a more accurate determination of nitrogen dioxide conversion rate 12. Internal combustion engine 30 optionally includes a first temperature sensor 45 to measure filter temperature 15 and a second temperature sensor 46 to measure catalytic converter temperature 17.

Engine data processor 1 is optionally designed for the suppression of yellow smoke and is also designed to determine at least one smoke visibility limit 21 in form of a yellow smoke visibility limit 3 and to determine control variable 5 for internal combustion engine 30 in such a way that the generation of yellow smoke is suppressed. Yellow smoke is a type of visible smoke 2 occurring often in the operation of internal combustion engines.

Engine data processor 1 includes a conversion unit 32, which is designed to calculate the series 28 of increased or decreased nitrogen conversion rates 12 depending on filter fill status information 20. Engine data processor 1 advantageously includes a conversion unit 32, which is designed to calculate lower nitrogen conversion rates 12 at increased exhaust gas filter level. This enables constant adaptation of calculated nitrogen conversion rates 12 to the current determined filter fill status and contributes to a more accurate determination of nitrogen dioxide conversion rate 12. The operating mode of conversion unit 32 can advantageously correspond to the illustration in FIG. 3.

In one advantageous arrangement, engine data processor 1 includes a model-predictive controller 35, wherein model-predictive controller 35 includes a limiting unit 41, which is designed to receive nitrogen dioxide conversion rate 12 and smoke visibility limit value 21, to compare them with each other and to therefrom develop an operating limit 34 for adjustment of an invisible exhaust gas composition 25 for internal combustion engine 30. This facilitates cost-effective operation of the internal combustion engine and, at the same time, prevention of visible smoke 2.

In one advantageous arrangement, model predictive controller 35 is designed to generate operationally optimized controller specifications 38 for adjusting mean catalytic converter temperature 22. This enables generation of commands with which detected mean catalytic converter temperature 22 can be actively influenced in order to enable cost-optimized operation of internal combustion engine 30 in addition to the invisible exhaust gas composition 25.

Internal combustion engine 30 optionally includes an actuator regulator 37, which is designed to receive the operationally optimized regulator specifications 38 and to therefrom determine control variable 5 for an actuation group 29 of engine 19. Control variable 5 represents for example commands to operate an actuation group 29 designed as valves in engine 19 over a certain duration and in a certain sequence so that a certain engine exhaust gas temperature 4 can be adjusted to influence the mean catalytic converter temperature 22 in order to influence the mean catalytic converter temperature 22 in a cost-optimized manner. This makes it possible to use engine exhaust gas temperature 4 to influence mean catalytic converter temperature 22 to facilitate cost-effective internal combustion engine operation.

Engine data processor 1 optionally includes control unit 36 which includes model-predictive controller 35 and actuator controller 37.

In one advantageous arrangement, engine data processor 1 may have an input data interface 27 via which control unit 36 can receive operating parameters 26 from engine 19 in order to monitor the operation of actuation group 29, which is designed as valves.

The engine data processor advantageously includes data storage 7 in which data from unit 8 for the determination of a smoke visibility limit value, from conversion unit 32 and from control unit 36 can be stored. These units can also gain access to the data. In this way—in addition to series 28 of nitrogen dioxide conversion rates 12—a current smoke visibility limit value 21.3 can also be plotted in the diagram on the right in FIG. 3.

Figure 4:
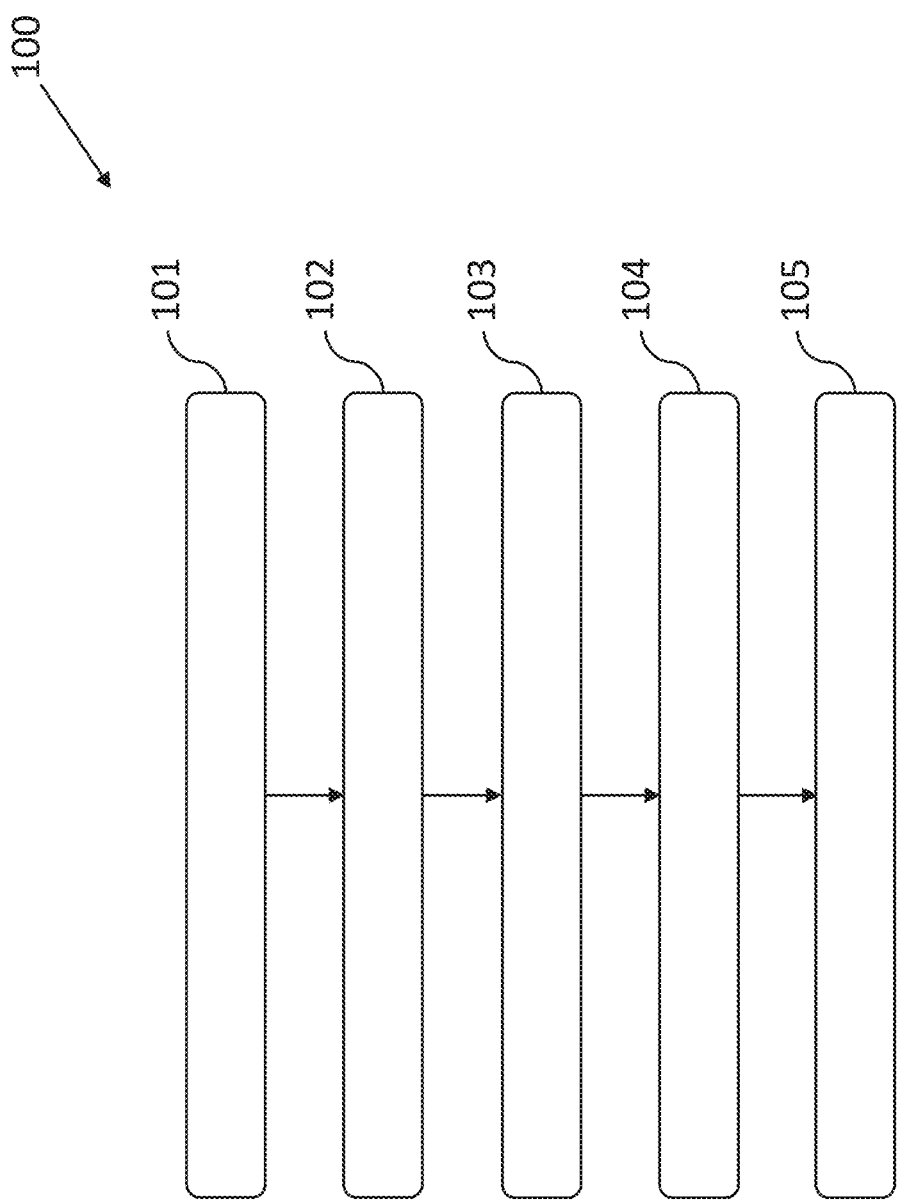
FIG. 4 is a schematic representation of a computer-implemented method according to one exemplary embodiment.

According to FIG. 4, a computer-implemented method 100 for adjustment of a filtered and catalyzed exhaust gas composition 25 in an exhaust unit 11 of an internal combustion engine 30 includes the following steps:

101: receiving geometric characteristic 10 of exhaust unit 11,

102: establishing smoke visibility limit value 21.3 from geometric characteristic 10,

103: receiving mean catalytic converter temperature and filter fill status information 20 and establishing nitrogen dioxide conversion rate 12, subject to the catalytic converter temperature 22 and filter fill status information 20,

104: comparison of the established smoke visibility limit value 21.3 with nitrogen dioxide conversion rate 12, and

105: establishing control variable 5 with which internal combustion engine 30 is operated so that exhaust gas composition 25 that is to be discharged at exhaust unit 11 is invisible.

Method 100 is advantageous because it facilitates cost-effective operation of the internal combustion engine without visible smoke 2. The consideration of geometric characteristic 10 of exhaust unit 11 enables an exact determination of control variable 5 and a flexible adaptation of method 100 to exhaust units 11 with different geometric characteristics 10. Taking into account mean catalytic converter temperature 22 and filter fill status information 20 increases the accuracy of the adjustment of gas composition 25.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An engine data processor for an internal combustion engine, the engine data processor comprising:
   the engine data processor, which is structured and arranged for adjusting a leaking exhaust gas composition for the internal combustion engine, the engine data processor being further structured and arranged for:
   receiving a geometric characteristic of an exhaust unit which is structured and arranged for being that through which the exhaust gas composition is discharged, and determining from the geometric characteristic a smoke visibility limit value;
   receiving a filter fill status information from an exhaust gas filter which is structured and arranged for filtering the exhaust gas composition;
   receiving a mean catalytic converter temperature of an exhaust gas catalytic converter structured and arranged for catalyzing the exhaust gas composition and determining a nitrogen dioxide conversion rate subject to the filter fill status information which has been received and the mean catalytic converter temperature;
   comparing the nitrogen dioxide conversion rate—which has been calculated—with the smoke visibility limit value, and determining therefrom a control variable for the internal combustion engine so that the exhaust gas composition is invisible; and
   issuing the control variable.

2. The engine data processor according to claim 1, wherein the engine data processor is structured and arranged for:
   calculating a series of nitrogen dioxide conversion rates subject to the filter fill status information; and
   determining the nitrogen dioxide conversion rate from the series, subject to mean catalytic converter temperature.

3. The engine data processor according to claim 1, wherein the engine data processor is structured and arranged for:
   receiving (i) a nitrogen oxide emission value detected at the exhaust unit, and (ii) an exhaust unit pressure value; and
   determining the smoke visibility limit value therefrom.

4. The engine data processor according to claim 3, wherein the engine data processor is structured and arranged for receiving a filter pressure value and establishing the filter fill status information from the exhaust unit pressure value and the filter pressure value.

5. The engine data processor according to claim 1, wherein the engine data processor is structured and arranged for receiving a filter temperature and a catalytic converter temperature and establishing the mean catalytic converter temperature therefrom.

6. The engine data processor according to claim 1, wherein, for a suppression of a yellow smoke, the engine data processor is structured and arranged for:
   establishing at least one smoke visibility limit value formed as a yellow smoke visibility limit value;
   establishing a control variable so that a generation of the yellow smoke is suppressed.

7. The engine data processor according to claim 1, wherein the engine data processor includes a conversion unit which is structured and arranged for calculating a series of increased or decreased nitrogen dioxide conversion rates depending on the filter fill status information.

8. The engine data processor according to claim 1, wherein the engine data processor includes a model-predictive controller, and wherein the model-predictive controller includes a limiting unit which is structured and arranged for receiving the nitrogen dioxide conversion rate and the smoke visibility limit value and for developing therefrom an operating limit for adjusting an invisible exhaust gas composition for the internal combustion engine.

9. An internal combustion engine, comprising:
   an engine data processor, which is structured and arranged for adjusting a leaking exhaust gas composition for the internal combustion engine, the engine data processor being further structured and arranged for:
   receiving a geometric characteristic of an exhaust unit which is structured and arranged for being that through which the exhaust gas composition is discharged, and determining from the geometric characteristic a smoke visibility limit value;
   receiving a filter fill status information from an exhaust gas filter which is structured and arranged for filtering the exhaust gas composition;
   receiving a mean catalytic converter temperature of an exhaust gas catalytic converter structured and arranged for catalyzing the exhaust gas composition and determining a nitrogen dioxide conversion rate subject to the filter fill status information which has been received and the mean catalytic converter temperature;
   comparing the nitrogen dioxide conversion rate—which has been calculated—with the smoke visibility limit value, and determining therefrom a control variable for the internal combustion engine so that the exhaust gas composition is invisible; and
   issuing the control variable;
   an engine structured and arranged for providing a mechanical power; and
   an exhaust gas aftertreatment system including the exhaust gas catalytic converter and the exhaust gas filter.

10. The internal combustion engine according to claim 9, wherein the engine data processor includes a model-predictive controller which is structured and arranged for generating from an operating limit a plurality of operationally optimal controller specifications for adjusting the mean catalytic converter temperature.

11. The internal combustion engine according to claim 10, wherein the engine includes an actuation group, and wherein the internal combustion engine further includes an actuator controller, which is structured and arranged for receiving the plurality of operationally optimal controller specifications and for determining therefrom the control variable for the actuation group of the engine.

12. A computer-implemented method for adjusting an exhaust gas composition in an exhaust unit of an internal combustion engine, the method comprising the steps of:
- receiving a geometric characteristic of the exhaust unit of the internal combustion engine;
- establishing a smoke visibility limit value from the geometric characteristic;
- receiving a mean catalytic converter temperature and a filter fill status information and establishing a nitrogen dioxide conversion rate subject to a catalytic converter temperature and the filter fill status information;
- comparing the smoke visibility limit value—which has been established—with the nitrogen dioxide conversion rate; and
- establishing a control variable with which the internal combustion engine is operated so that the exhaust gas composition that is to be discharged at the exhaust unit is invisible, the computer-implemented method being for adjusting the exhaust gas composition which has been filtered and catalyzed in the exhaust unit.

* * * * *